United States Patent [19]
Belinkoff

[11] Patent Number: 5,434,392
[45] Date of Patent: * Jul. 18, 1995

[54] MICROWAVE DRIP COFFEE MAKER

[75] Inventor: Irving Belinkoff, Bellerose Manor, N.Y.

[73] Assignee: Farberware, Inc., Bronx, N.Y.

[ * ] Notice: The portion of the term of this patent subsequent to Mar. 12, 2008 has been disclaimed.

[21] Appl. No.: 399,736

[22] Filed: Aug. 28, 1989

Related U.S. Application Data

[63] Continuation-in-part of Ser. No. 310,451, Feb. 13, 1989, abandoned.

[51] Int. Cl.⁶ .............................................. H05B 6/80
[52] U.S. Cl. .................................... 219/689; 99/302 R; 426/241
[58] Field of Search ................ 219/10.55 E, 10.55 F, 219/10.55 R, 10.55 M, 689; 99/302 R, 281, 282, 304, 306–312, DIG. 14, 451; 426/241

[56] References Cited

U.S. PATENT DOCUMENTS

| | | | |
|---|---|---|---|
| 2,365,269 | 5/1944 | Hill | 99/305 |
| 2,403,404 | 7/1946 | Scott | 99/302 |
| 2,601,067 | 6/1952 | Spencer | 99/292 |
| 3,570,390 | 3/1971 | Jordan et al. | 99/282 |
| 3,736,155 | 5/1973 | Martin | 99/282 |
| 3,757,670 | 9/1973 | Laama et al. | 99/302 |
| 3,793,934 | 2/1974 | Martin | 99/282 |
| 3,859,902 | 1/1975 | Neumann et al. | 99/305 |
| 4,104,957 | 8/1978 | Freedman et al. | 99/283 |
| 4,132,239 | 1/1979 | Bowen et al. | 137/382 |
| 4,147,097 | 4/1979 | Gregg | 99/283 |
| 4,162,054 | 7/1979 | Häuslein | 248/94 |
| 4,200,039 | 4/1980 | Anderl | 99/302 R |
| 4,381,696 | 5/1983 | Koral | 219/10.55 E |
| 4,386,109 | 5/1983 | Bowen et al. | 219/10.55 E |
| 4,417,116 | 11/1983 | Black | 219/10.55 A |
| 4,527,467 | 7/1985 | Siemensma | 99/279 |
| 4,577,080 | 3/1986 | Grossman | 219/10.55 E |
| 4,642,443 | 2/1987 | Jorgensen et al. | 219/10.55 E |
| 4,721,835 | 1/1988 | Welker | 219/10.55 E |
| 4,739,696 | 4/1988 | Sheen | 99/279 |
| 4,756,915 | 7/1988 | Dobry | 426/234 |
| 4,785,723 | 11/1988 | Sheen | 99/279 |
| 4,815,366 | 3/1989 | Häuslein | 99/283 |
| 4,819,553 | 4/1989 | Heyn et al. | 99/305 |
| 4,900,886 | 2/1990 | Bridges | 219/10.55 |
| 4,908,222 | 3/1990 | Yu | 219/10.55 E |
| 4,999,466 | 3/1991 | Waligokski | 219/689 |

FOREIGN PATENT DOCUMENTS

| | | |
|---|---|---|
| 506346 | 10/1951 | Belgium . |
| 747411 | 6/1933 | France . |
| 2500288 | 8/1982 | France . |
| 926087 | 4/1955 | Germany . |
| 2600018 | 7/1977 | Germany . |
| 2628735 | 12/1977 | Germany . |
| 7807403 | of 0000 | Netherlands . |

*Primary Examiner*—Philip H. Leung
*Attorney, Agent, or Firm*—Seidel Gonda Lavorgna & Monaco

[57] ABSTRACT

A brewing apparatus which makes coffee by the drip method within a microwave oven. The brewing apparatus having a reservoir for retaining a quantity of water for heating. The reservoir positioned on a carafe for receiving a quantity of brewed coffee therein. A basket is positioned between the reservoir and the carafe for retaining the coffee grounds while permitting brewed coffee to pass therethrough. A water transfer tube is positioned within the reservoir having an inlet adjacent the internal bottom of the reservoir and an outlet positioned below the external bottom of the reservoir. The tube forming a bight above the water line within the reservoir. The application of microwave energy heats the water within the reservoir initiating a pumping system that creates a hydraulic head advantage through the transfer tube. The advantage creates a continuous flow of water from the reservoir through the outlet and onto the coffee grounds within the basket. The brewed coffee, created by the continuous contact between the heated water and the coffee grounds, passes from the basket into the carafe.

28 Claims, 5 Drawing Sheets

MICROWAVE DRIP COFFEE MAKER

This is a continuation-in-part of application Ser. No. 07/310,451, filed Feb. 13, 1989 now abandoned.

The present application is related to commonly assigned, design application Ser. No. 07/369,547, filed Jun. 20, 1989, U.S. Pat. No. D352,418 which is a continuation-in-part of Ser. No. 07/298,584, filed Jan. 17, 1989, U.S. Pat. No. D325,846. The present application is also related to commonly assigned application Ser. No. 07/310,447, filed Feb. 13, 1989, U.S. Pat. No. 4,999,466. These applications are hereby incorporated by reference

BRIEF DESCRIPTION OF THE INVENTION

The present invention relates to a brewing apparatus which makes coffee, tea or other brewing material by the drip method within a microwave oven. The brewing apparatus retains a quantity of water within a reservoir. The water is heated by microwave energy. The heating of the water activates a pumping system that initiates a hydraulic head advantage to continuously transfer water from the reservoir into a basket containing the brewing material. The continuous flow of water onto the brewing material brews the coffee, tea or the like.

BACKGROUND OF THE INVENTION

Previous apparatus to make "microwave coffee" either use the percolation method (U.S. Pat. No. 4,642,443) or control the deposit of heated water onto the coffee grounds by a temperature sensitive valve (U.S. Pat. Nos. 4,104,957, 4,381,696 and 4,132,039). The valve in these type microwave coffee makers is adapted to open at a predetermined temperature of the water retained in a reservoir. Upon opening of the valve, the entire quantity of water retained in the reservoir is deposited onto the coffee grounds.

Previous coffee brewing apparatus, which operate outside of a microwave oven, have been known to brew coffee using a water transfer method that relies on a pressure increase created within a sealed vessel during the water heating process (U.S. Pat. No. 4,200,039).

SUMMARY OF THE INVENTION

The coffee making apparatus of the present invention preferably includes a carafe that forms a base or support. A water reservoir forms a lid for the carafe and retains a quantity of water for heating by microwave energy. A transfer tube is provided within the reservoir. Preferably, the tube forms a U-shape having its inlet positioned below the water line in the reservoir and closely adjacent the bottom inside surface of the reservoir basin. The bight of the U-shape is positioned above the water line in the reservoir. The transfer tube outlet is positioned outside of the reservoir at a level below the bottom inside surface thereof. The outlet is positioned to exhaust into a basket adapted to retain coffee grounds (or other brewing material) and to permit brewed coffee (or the like) to pass into the carafe.

The above described apparatus brews coffee according to the following preferred method. The reservoir is filled with the quantity of water intended to be brewed into coffee. A corresponding amount of coffee grounds is placed within the basket. The reservoir and basket are placed on top of the carafe and supported thereby. The assembled apparatus is inserted into the cavity of the microwave oven and exposed to the microwave energy. The microwave energy initiates the brewing cycle by heating the water. The elevation of the water temperature activates the pumping system that forces water to rise in the inlet leg of the transfer tube toward the bight of the U-shape. Upon filing the inlet leg, water flows over the bight and creates a hydraulic head advantage. The advantage creates a continuous flow of water from the reservoir, through transfer tube, into the coffee basket and onto the coffee grounds. The heated water partially dissolves the coffee grounds and brews coffee. The brewed coffee passes through the basket and is collected within the carafe at the base of the apparatus. The apparatus is removed from the microwave oven upon transfer of substantially all the water from the reservoir. The reservoir and basket are removed from the top of the carafe and coffee is served.

It is contemplated by the present invention that the hydraulic head advantage, once initiated, will cause a continuous flow of water from the reservoir. However, the creation of this continuous flow of water need not depend on a continuous pressure increase within a sealed reservoir. Other features of the invention will become apparent by describing preferred embodiments thereof.

BRIEF DESCRIPTION OF THE DRAWING

For purposes of illustrating the invention, there is shown in the drawings forms which are presently preferred; it being understood, however, that this invention is not limited to the precise arrangements and instrumentalities shown.

DETAILED DESCRIPTION OF THE DRAWING

In the figures where like numerals indicate like elements there is shown an apparatus 10 of the type contemplated by the present invention. The apparatus 10 is of sufficient dimension to retain the desired quantity of water to be brewed into coffee. (Other brewing materials, such as tea, are contemplated herein. However, the term coffee will be used generically substantially throughout the text.) The apparatus 10 is formed so as to fit within the cavity of a microwave oven (not shown). The microwave oven is contemplated to be of any type available on the market. An oven rated in excess of 500 watts is preferred. Lower wattage units may effect the time required to sufficiently heat the water for brewing, and thus may extend the length of the brewing cycle.

Figure 1:
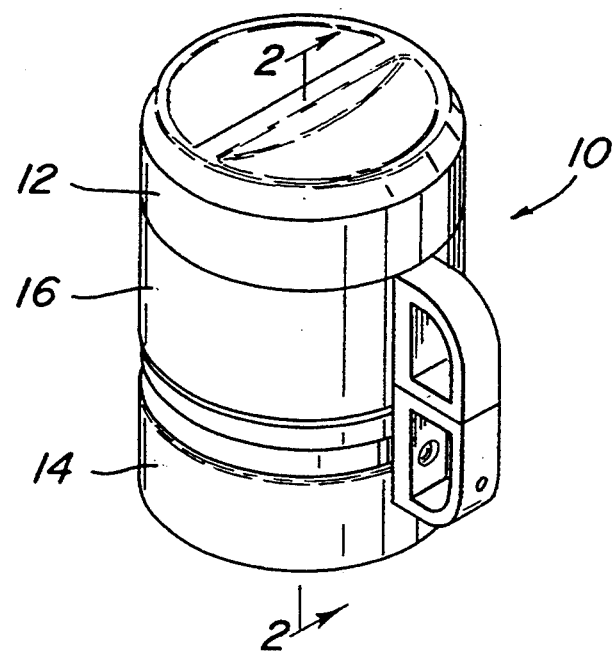
FIG. 1 shows an embodiment of a microwave drip coffee brewing apparatus contemplated by the present invention.
Figure 2:
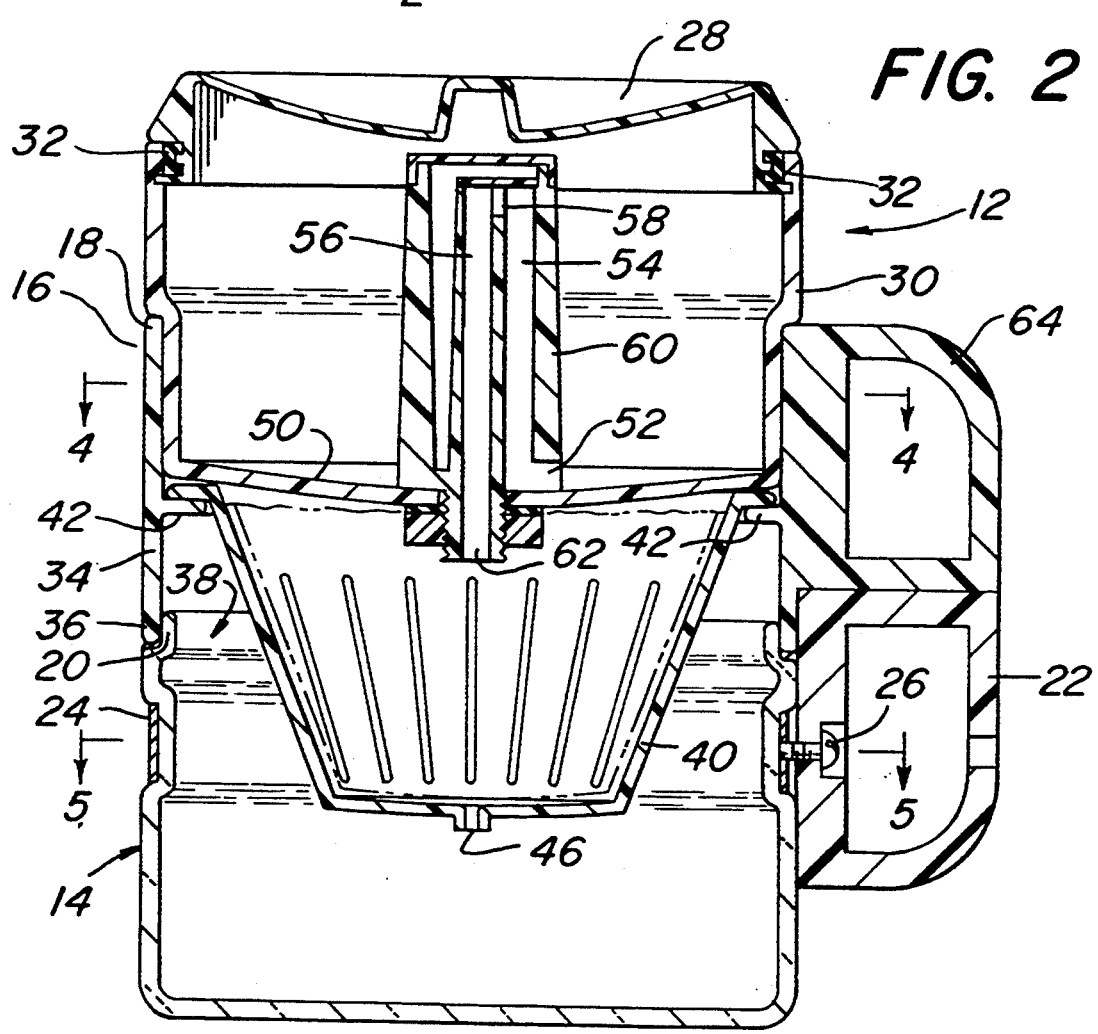
FIG. 2 is a cross-sectional view thereof taken along line 2—2 in FIG. 1.
Figure 3:
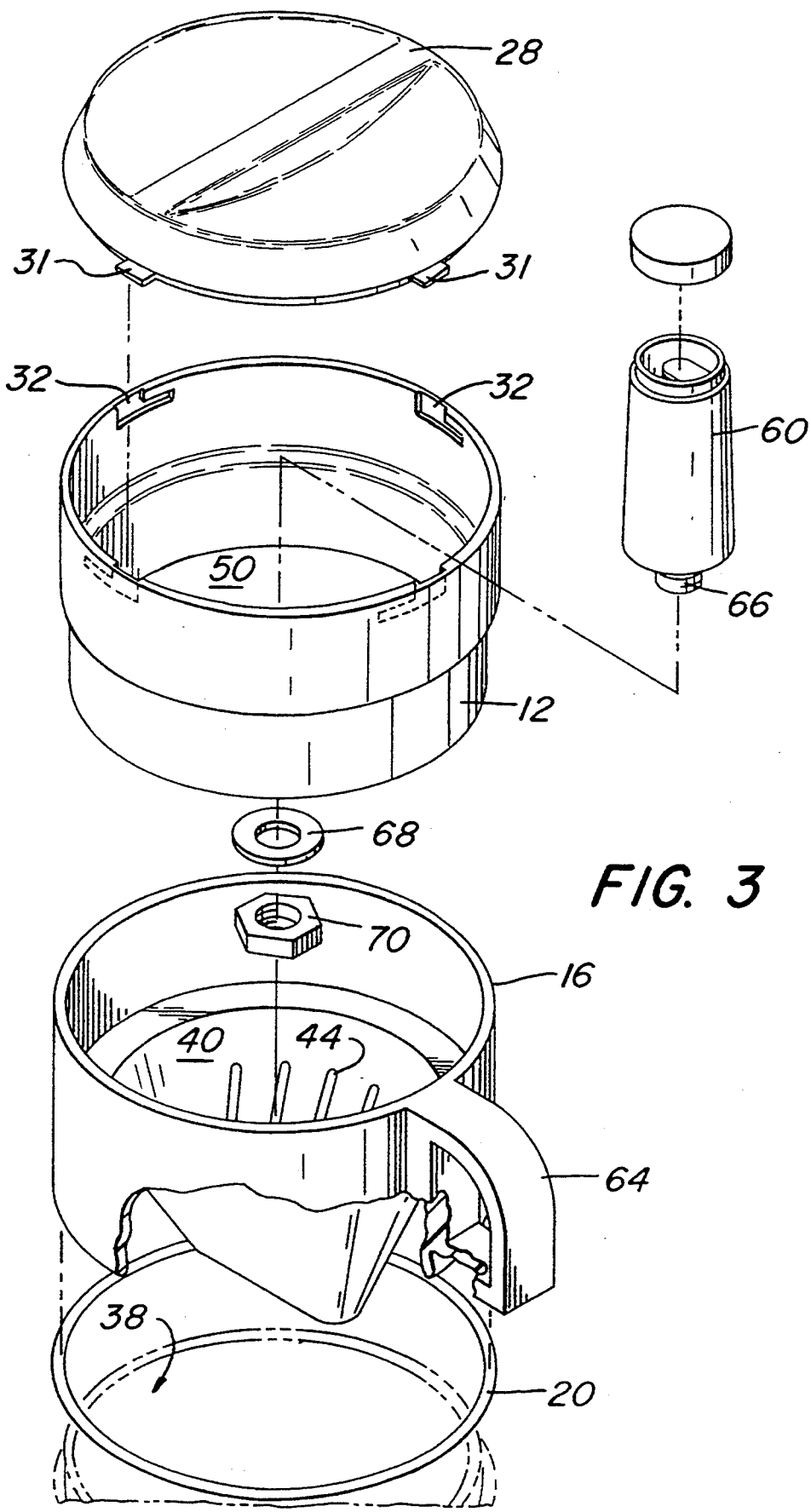
FIG. 3 is an exploded view thereof.
Figure 4:
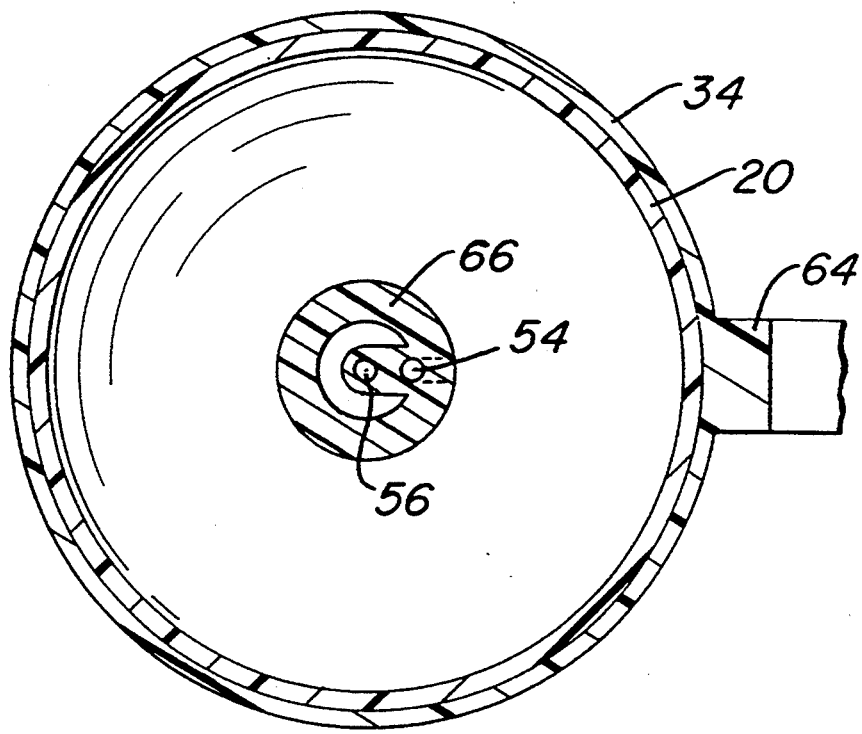
FIG. 4 is a cross-sectional view thereof taken along line 4—4 in FIG. 2.

The apparatus 10 generally comprises a reservoir portion 12, a carafe 14 and a coffee basket portion 16. The reservoir 12, as shown, is supported on the upper rim 18 of the coffee basket 16. Basket 16 is positioned on the rim 20 of the carafe 14 with portions extending into its interior. The carafe 14 is generally contemplated to be made of a microwave pervious or transparent material. The carafe 14, as shown in FIGS. 1 and 2, is translucent or transparent so that the brewed coffee may be viewed through the side walls thereof.

The carafe 14 includes a handle 22 which is attached to the side walls thereof. The handle 22 may be secured to the carafe 14 in any manner desired. As illustrated, the handle 22 is secured by screw 26 to band 24 which is wrapped around the side walls of the carafe 14. The band 24 may be made of metal or any other suitable material as desired. The method of attachment shown may be supplemented by having the top portion of the handle 22 hook over the rim 20 of the carafe 14 (not shown). A clamping mechanism (not shown) may also be used instead of screw 26 to attach the handle 22 to the carafe 14. Also, the handle may be formed as an integral part of the carafe body.

The reservoir portion 12 may be formed by any convenient method as desired. As shown in FIG. 2, the reservoir 12 includes an upper portion or lid 28 and a separate lower portion or basin 30. The lid 28 is attached to the basin 30 via tabs 31 which engage slots 32 within the rim of basin 30. The engagement of the tabs 31 with slots 32, and generally the cooperation between the lid 28 and the basin 30, is contemplated to be sufficient to seal the chamber formed thereby when the lid 28 is attached. A screw on type lid (not shown) or other type formation may also be used as an alternative to the structure illustrated herein.

The reservoir 12 and its constituent parts are preferably made of a microwave transparent material, such as polycarbonate. Other microwave transparent materials, such as polypropylene, may also be used. The reservoir 12 is contemplated to be elevated within the oven cavity. Thus, positioned close to the magnetron outlet. The reservoir 12 in this position will be subjected to a relatively higher rate of microwave energy, since less scattering will have taken place upon first introduction into the oven cavity. Thus, the water will heat at a faster rate; reducing brewing time.

Coffee basket 16 is positioned below reservoir 12. Coffee basket 16 includes vertical side walls 34 which rest at their base 36 on the upper rim 20 of carafe 14. The upper end of side walls 34 form rim 18 to support reservoir 12. The coffee basket 16 is positioned on rim 20 substantially in alignment with the open top 38 of carafe 14.

Figure 5:
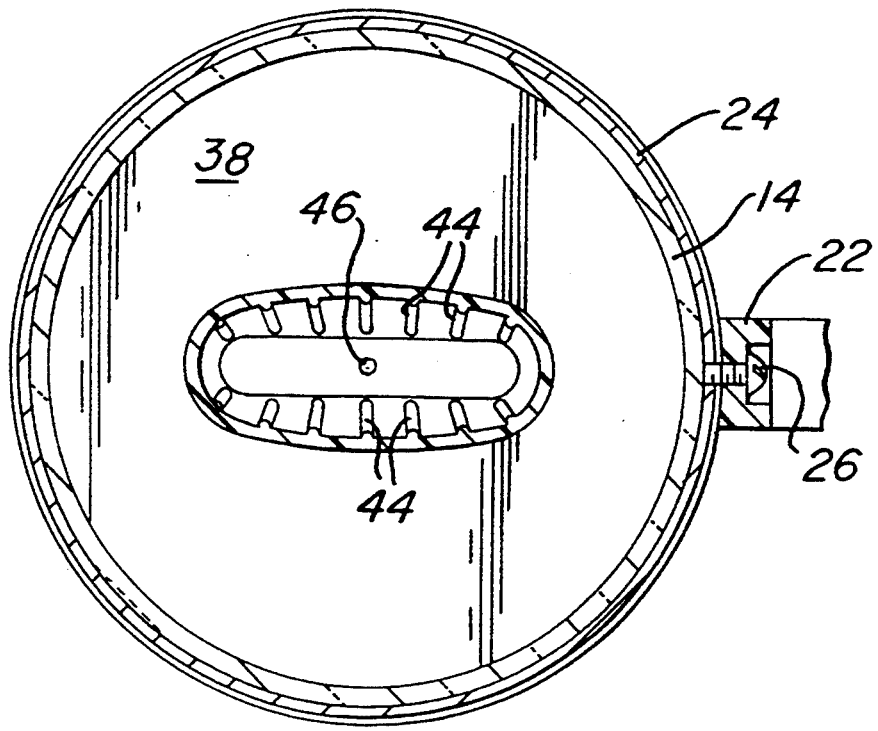
FIG. 5 is a cross-sectional view thereof taken along line 5—5 in FIG. 2.

The coffee basket 16 also includes a well 40 for retaining coffee grounds. The well 40 may be supported within the side walls 34 by flange 42. The well 40 appears in the cross-section of FIG. 2 to have a frustoconical shape with the large end being open upwardly. As more clearly illustrated in FIG. 5, the taper of well 40 is elliptical. The basket 16 is contemplated to permit the passage of heated water through the coffee grounds to outlet 46 in the bottom of the well 40. On the interior surfaces of the well 40 is a series of upstanding ribs 44 which act as a channeling means for the water to outlet 46. A filter (not shown) may be used to retain the coffee grounds during brewing. Ribs 44 serve to support the filter away form the inside surface of the well 40 and permit coffee to flow from all surfaces of the filter toward the outlet 46.

The coffee basket 16 may be made of a microwave permeable material, the same as that used for the reservoir 12. Although the coffee grounds are normally heated by the microwave energy, it has been determined that the water will act as a shield during the brewing cycle. This is due to the fact that microwave energy acts on water, vegetable and mineral in that order. The water from the reservoir will be directed onto the coffee grounds within the well 40, shielding the grounds. Further, the mass of the water in the reservoir 12 will absorb the microwaves directed at the top of the apparatus 10 until the water has been transferred through the brewing cycle. A screen or perforated well (not shown) or a metal basket (also not shown) may be used, if desired.

Within the interior of the reservoir 12 is provided a water transfer tube 60. Tube 60 is supported on the reservoir bottom 50 and projects upwardly to a position closely adjacent the lid 28. Tube 60 includes an inlet 52 which is positioned closely adjacent the interior surface of bottom 50. The bottom 50 is preferably drafted so as to angle towards the inlet 52. Tube 60 may be attached to the reservoir bottom 50 in any convenient manner. As shown, the base of tube 60 includes a threaded projection 66 which is placed though an opening in the center of the reservoir bottom 50. Tube 60 is locked and sealed to the bottom 50 by washer 68 and nut 70. The tube 60 may also be integrally formed with the basin 30 of the reservoir 12.

Within the interior of tube 60 is formed a passageway having an inlet leg 54 and an outlet leg 56. At the top of the legs 54, 56 is formed a bight 58. The tube 60 substantially forms a U-shaped passageway with the bight 58 preferably positioned above the maximum water level within the reservoir 12. The outlet 62 of leg 56 is positioned below the bottom 50 of the reservoir 12 and below inlet 52. The bore of the passageway formed by the two legs 54, 56 is preferably of constant cross-section. The dimensions of the bore may vary depending on the desired flow rate through tube 60. A slight convergence (not shown) within the outlet leg 56 may be added near the outlet 62. This convergence would slow the fall of water from the bight 58. The outlet 62 of tube 60 is preferably positioned directly above well 40 of coffee basket 16. Water passing through outlet 62 will be deposited into the well 40 and onto the coffee grounds. The basket 16 may include means (not shown) for restricting the water flow onto the coffee grounds within the well 40, such as a perforated lid.

The operation of the apparatus 10 is generally contemplated to be as follows.

First, the apparatus 10 is loaded and assembled. The lid 28 is removed from basin 30 and water is poured into the reservoir 12. The lid 28 is placed onto the basin 30, sealing the water from ambient air. Coffee grounds are placed within well 40. The reservoir 12 is placed onto the rim 18 of basket 16 and covers the grounds. The basket 16 and reservoir 12 are placed onto the rim 20 of the carafe 14 with the well 40 projecting into the opening 38. The apparatus 10 is then placed into the cavity of the microwave oven with the oven being set for operation.

Upon exposure of the microwave energy to the apparatus 10, the water within the reservoir 12 is heated and the brewing cycle is initiated. The heating of the water initiates a pumping system by increasing the pressure within the sealed reservoir 12. The seal of the lid to the reservoir in this embodiment is preferably sufficient to withstand the contemplated pressure variation within the reservoir chamber. The increase in pressure causes water to be forced into inlet 52 and upwardly through inlet leg 54 of transfer tube 60. Upon reaching the bight 58, the water begins to flow over into the outlet leg 56. Because the outlet 62 of the transfer tube 60 is positioned below the water line within the reservoir 12 and below the inlet 52, a hydraulic head advantage occurs. This advantage causes a continuous flow of water from the reservoir 12, through the U-shaped passageway of the transfer tube 60 and onto the coffee grounds within the well 40 of basket 16. It is contemplated that the creation of the advantage causes a substantially continuous flow of water, and that further pressure build-up within the reservoir 12 is not necessarily required. The advantage forces water from the reservoir chamber until the level within the reservoir reaches the level of the inlet 52 to tube 60. Upon reaching this level, air enters the inlet leg 54 and breaks the advantage.

As the coffee grounds are exposed to the heated water, the grounds partially dissolve and coffee is brewed. The brewed coffee then passes through the outlet in the well 40 and into the carafe 14. It is preferred that the carafe 14 be sized such that the level of the brewed coffee fills only to a position below the bottom 48 of the well 40.

The apparatus 10 may be removed from the microwave oven upon transfer of all water from the reservoir 12, through the brewing cycle and into the carafe 14. The reservoir 12 is then removed from rim 18 of the basket 16. The basket 16 is removed from the rim 20 of the carafe 14. The used coffee grounds are disposed of and the coffee is served from the carafe 14.

A handle 64 is provided on the basket 16 to assist in its removal. This handle is preferably continuously formed with the side walls 34 of the basket 16. The heating of the water may cause the reservoir 12 to heat during brewing. However, since the materials used for the basket 16 and the reservoir 12 are contemplated to be microwave permeable, the microwave energy will not substantially heat these portions of the apparatus 10.

Figure 6:
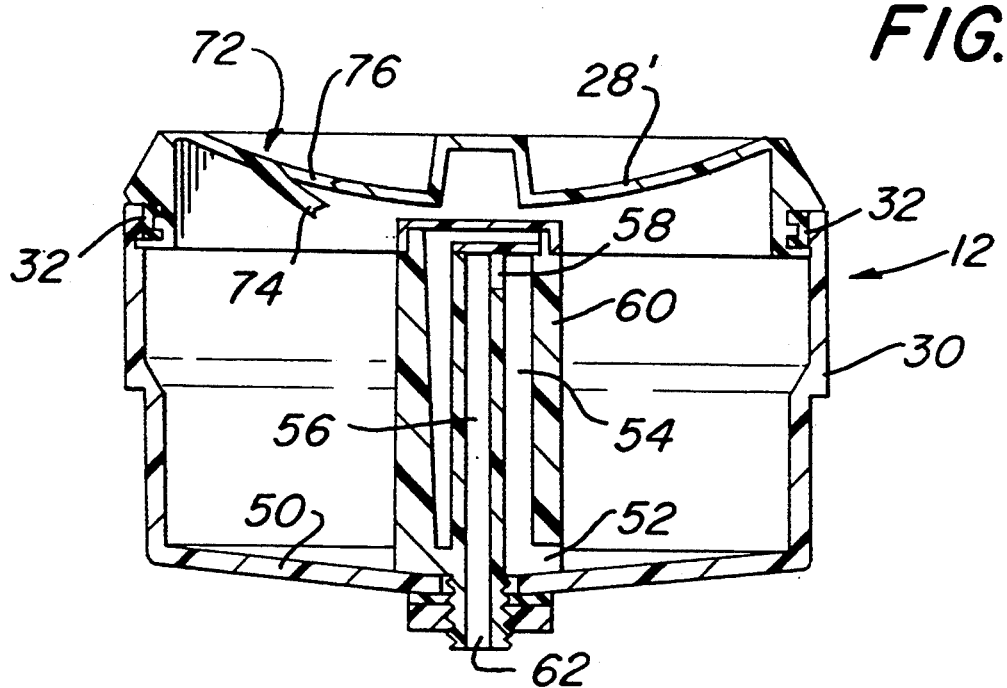
FIG. 6 is an alternate embodiment of the present invention.

Illustrated in FIG. 6 is an alternate embodiment of the lid 28' of the reservoir 12' having a pressure relief means 72 for breaking the seal of the reservoir chamber and exposing the chamber to ambient pressure after initiation of the advantage. It is possible that the flow of water from the sealed reservoir 12, due to the hydraulic head advantage, will create a pressure differential within the reservoir chamber that would counter the flow of water through the transfer tube 60. This pressure differential would be caused by the flow of water through tube 60 at a faster rate than the increase in pressure created by further elevation of the water temperature caused by the microwave energy.

Means 72 may take the form of a hinged flap 74 which is attached to the lid 28' of the reservoir 12'. The flap 74 is formed normally open. Thus, the chamber is normally in an unsealed condition. When lid 28' is placed onto the basin 30, the flap 74 will be snapped onto its seat 76 to form the seal. The engagement between flap 74 and seat 76 on lid 28' is contemplated to be such that the flap 74 will release at a given pressure differential within the chamber. This release preferably occurs after the initiation of the advantage. The engagement between flap 74 and seat 76 will release at a negative pressure within the chamber. The provision of the pressure relief means 72 is contemplated to create a flow rate, from the reservoir 12' into the basket 16, that is steady and more consistent than if the reservoir chamber were to be remain sealed throughout the brewing cycle. In the alternative, the pressure release means may also release at the build-up of too great a pressure in the chamber. In this second condition, the flap 74 would be forced outwardly, opposite that shown in FIG. 6.

Figure 7:
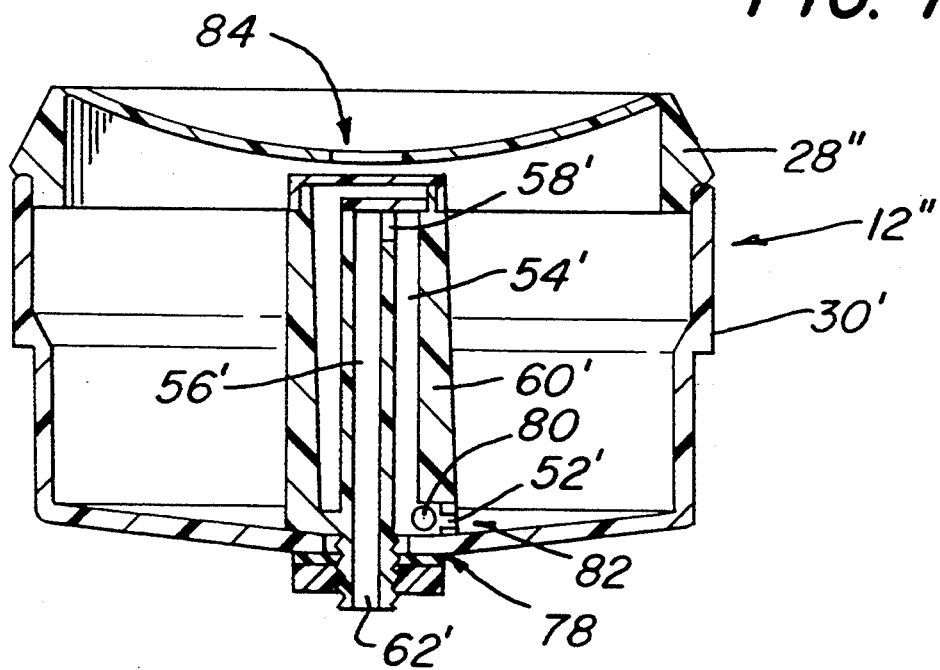
FIG. 7 is cross-sectional view of a third alternate embodiment of the present invention.

An alternative reservoir structure 12" is illustrated in FIG. 7. In this embodiment the reservoir chamber formed by the lid 28" and basin 30' need not be sealed. Opening 84 is provided in lid 28" and may be formed as an inlet for introducing water into the reservoir 12". The inlet 52' to transfer tube 60' includes a check valve 78. Valve 78 includes a ball 80 retained in passageway 82 at the inlet 52. The value 78 is formed to prevent the backflow of water from the inlet leg 54'. The transfer tube 60' is preferably positioned closely adjacent the side walls of the reservoir basin 30'. When water is filled into the basin 30' the level will balance in the chamber and the inlet leg 54'. Upon exposure to microwave energy, the water in both the chamber and the inlet leg 54' will heat and expand. The water in leg 54' preferably heats at a greater rate due to its lower mass as compared to that in basin 30'. Ball 80 will seat at the end of passageway 82 to prevent the column of water from returning back into the reservoir chamber. Thus, the expansion of the heated water within inlet leg 54' will rise to the top of the bight 58 and flow over into outlet leg 56', creating the hydraulic head advantage. Again, the flow of water due to the advantage is contemplated to be continuous. Further, the flow from the chamber will be substantially unaffected by pressure variations within the reservoir 12".

The change in pressure caused by the heating of the water within the sealed reservoir, if remaining sealed, is contemplated to fluctuate over the heating cycle due to the transfer of water volume through the transfer tube and the continuous heating of the water by the microwave energy. However, the flow rate of the water through the tube 60 caused by the hydraulic head advantage is contemplated to be substantially faster than that caused by the pressure increase alone. This relatively faster flow rate is considered advantageous, since the temperature of the water deposited onto the coffee grounds over the brewing cycle will remain relatively low as compared to a transfer technique that relies on continuous heating or boiling of the water to cause further water transfer. Thus, the coffee grounds will not be scalded by over-heated water creating bitterness within the brewed coffee.

Figure 8:
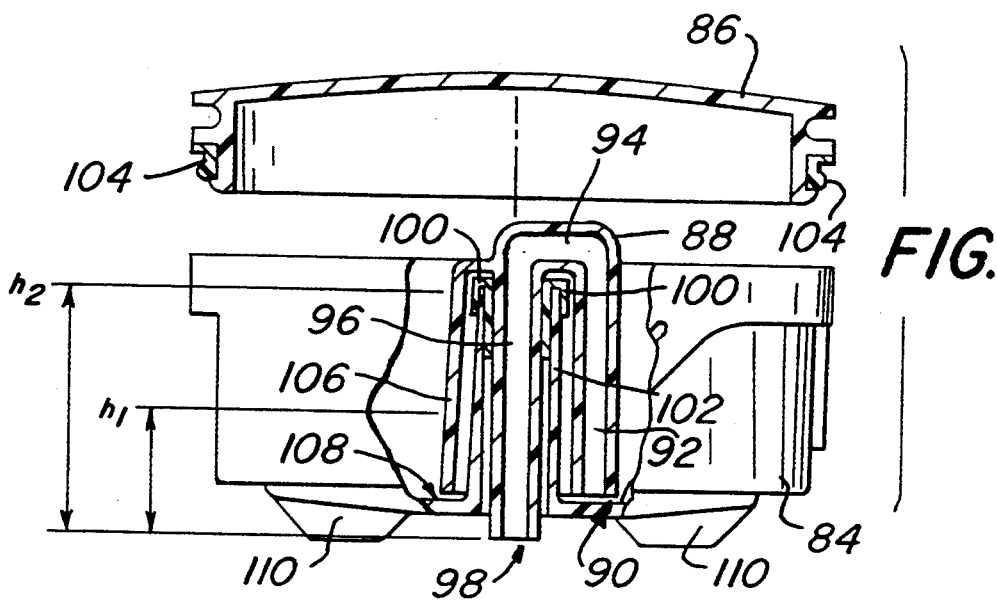
FIG. 8 is a cross-sectional view of a fourth alternate embodiment of the present invention.

In FIG. 8 there is shown another embodiment of a reservoir 84 to be used along with the other portions of the apparatus as previously described. A lid 86 is provided for the reservoir 84 to form a sealed internal chamber therein. Positioned within the chamber is transfer tube 88.

Transfer tube 88 generally includes an inlet 90, an inlet leg 92, a bight 94, an outlet leg 96, and an outlet 98. The transfer tube 88 in the present embodiment is generally contemplated to be removable from the reservoir 84. A seal 100 is provided on an upstanding projection 102 positioned within the reservoir 84. The outside surfaces of the outlet leg 96 engage the seal 100 to prevent the passage of air into or out of the chamber. A skirt 106 is provided on the transfer tube 88 to assist in the sealing of the outlet leg 96 with the projection 102 and seal 100.

A seal 104 is also provided on the rim of the lid 86. Seal 104 engages the inside surfaces of the upper portion of the reservoir 84. Thus, the chamber formed by the lid 86 and reservoir 84 is completely sealed from ambient air upon closing the lid. The seal 104 for the lid or the seal 100 for the transfer tube 88 is contemplated to be made of a silicon rubber material and formed by a single piece.

As in the previously described embodiments, the outlet 98 of the transfer tube 88 is positioned below the inlet 90 and the bottom surface 108 of the reservoir 84. Further, the diameter of the bore formed by the inlet leg 92, bight 94 and outlet leg 96 has a substantially constant cross-section. Thus, the pumping system creates a hydraulic head advantage for the continuous transfer of water retained within the chamber. Further, bight 94 is positioned within the chamber above the upper rim of the reservoir 84. Thus, even if the water within the reservoir 84 is filled to the top of the reservoir, the bight projects above the water level. Reservoir 84 is provided with projecting feet 110 which support the reservoir 84 when placed on a counter surface after disassembling the apparatus 10. The feet 110 are contemplated to project below the bottom of the reservoir 84 a greater distance than the projection of the outlet 98 of transfer tube 88.

Figure 9:
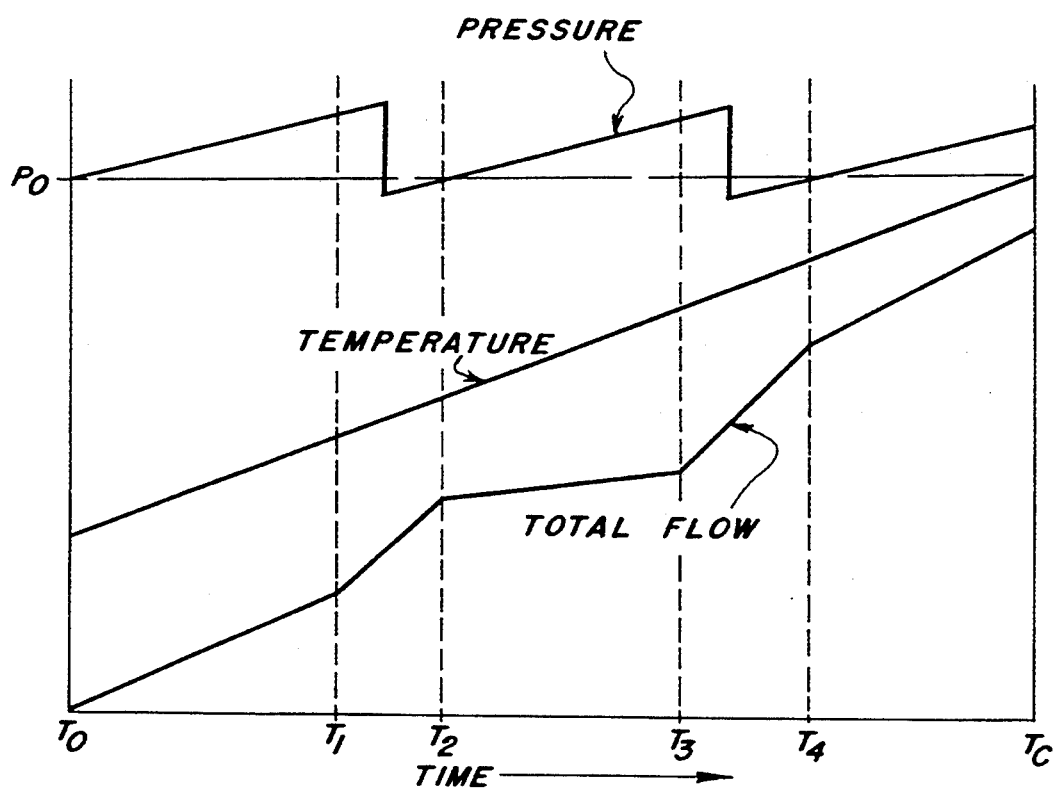
FIG. 9 is a schematic representation of the change in pressure within a sealed reservoir as contemplated by the present invention as compared to the water temperature and total flow.

FIG. 9 is a schematic representation of the relationship of the pressure within the chamber, the temperature of the water retained therein and the total flow of the water from the chamber. When water is filled within the reservoir 84, the placement of the lid 86 on top creates an initial pressurization of the chamber. This initial pressurization serves to prime the transfer tube 88, causing the water to flow upwardly through the inlet leg 92 and over the bight 94. The water expelled from the outlet 98, upon this initial pressurization, is discharged into the coffee basket, pre-wetting the grounds. It is contemplated that the pressure within the chamber will be slightly greater than ambient pressure due to the rebalancing of the water level within the transfer tube 88 and the chamber.

The initial pressure $P_0$ within the chamber is defined on the graph in FIG. 9. The starting time $T_0$ for the brewing cycle is the initiation of the microwave energy from the microwave oven. The microwave energy immediately begins to increase the water temperature within the chamber. This increase in temperature of the water over the brewing cycle is substantially linear. The increase in temperature causes an increase in the pressure within the chamber. Because of the priming of the transfer tube, the pumping system is initiated substantially immediately upon application of the microwave energy.

The flow of water caused by the increase in pressure during this initial time period T is substantially constant. At a certain point in time the flow rate fills "the bight 94 in the transfer tube 88 and the hydraulic head advantage is initiated. This advantage causes a substantial increase in the flow rate of the water from the reservoir 84 through the transfer tube 88. This increased flow causes a drop in pressure within the chamber due to the substantial reduction in water volume therein, without a corresponding increase in pressure due to a rise in water temperature. The pressure is contemplated to become substantially negative, or below ambient, and below the initial pressure $P_0$. This negative pressure causes a restriction on the flow of the hydraulic head advantage. This restricted flow is seen at the period between times $T_2$ and $T_3$.

It is contemplated that the brewing cycle will further include a second pressure increase with the hydraulic head advantage again taking precedent over the pumping system. A sudden increase in flow occurs at about time $T_3$. During the time period between $T_3$ and $T_4$ there is a second substantial reduction in the pressure within the chamber. However the higher water temperature likely restores the vapor pressure at a faster rate, causing a faster flow between the period $T_4$ through $T_c$ than during the period $T_2$ through $T_3$. Upon completion of the brewing cycle, substantially all of the water flows through the transfer tube into the coffee basket.

FIG. 9 is representative of the observed operation of an apparatus made in accordance with the present invention. The number of pressure cycles during any brew may vary according to the water temperature, the quantity of water within the chamber, the diameter of the bore of the transfer tube, the wattage of the microwave oven and other factors. The slope and positioning of the curves illustrated are not limiting. Variations in structure of the reservoir and transfer tube will also change the results obtained from the application of microwave energy. The curve would change upon the application of the pressure release means 72. Further the ball check valve 78 would operate without any pressure variations in the reservoir i.e. with the system remaining at ambient pressure.

The fluctuation in flow rate over the brewing cycle substantially assists the coffee preparation in a number ways. A drip brewing method requires a certain residence time for the water to be in contact with the coffee grounds. Further, the amount of water input into the basket during any particular time is desired to be controlled. The bore diameter through the transfer tube 88 is considered to be a substantial factor in controlling the 30 flow rate. Further, the air space within the chamber formed by the reservoir 84 and the lid 86 contributes to this flow. In the embodiment shown in FIG. 8 the reservoir 84 is contemplated to hold up to two cups of water. The bore diameter is further contemplated to be 3/16 of an inch. These factors regulate the fluctuation in pressure and the effect of the hydraulic head advantage. The fluctuation in pressure within the chamber in this embodiment is contemplated to be in the $\pm .5$ psi range.

The transfer of water from the reservoir into the coffee basket is defined by the term "hydraulic head advantage". The pumping system of the brewing apparatus of the present invention creates this hydraulic head advantage by means of the transfer tube and its internal structures. The tube as shown includes a substantially "U"-shaped passageway having a constant bore through which water can be moved from a higher to a lower level in a substantially continuous manner. The pumping system in the present invention is created by means of the heating the water via the microwave energy. In the embodiments shown in FIGS. 1, 6 and 8 the pumping of the water is initially created by the internal pressure within the chamber defined by the lid and the reservoir, as well as the static pressure of the water within the reservoir. These pressures force the liquid up the inlet leg and over the bight of the transfer tube. Upon a continuous flow filling the bight and the longer outlet leg of the transfer tube, the weight of the water within the outlet leg creates a continuous downward pressure and a corresponding downward flow. In the embodiment shown at FIG. 7, it is the relationship between the heating and expansion of the water molecules within the inlet leg, in combination with the weight of the water within the reservoir, which causes the upward movement of the water in the inlet leg. The ball check valve prevents the flow of water returning into the reservoir chamber.

The pumping system in the present invention initiates the hydraulic head advantage by the application of the microwave energy. In the embodiments shown the pressure forcing the water through the transfer tube is initially created at the inlet end of the transfer tube. A continuous flow of water is created without there being a suction or lowering of the pressure in the U-tube or the like at the outlet end or the water rising above the top of the bight on the inlet side, as would generally be contemplated by a siphon type tubing arrangement. This hydraulic head advantage has a significant effect in the overall effectiveness of the presently contemplated invention.

The potential energy created by the water level within the reservoir contributes to the flow rate of the hydraulic head advantage. As illustrated in FIG. 8, if the reservoir were filled with a water at a level h, the potential energy of this water level is measured against the outlet 98 of the transfer tube 88. A higher water level $h_2$ has a greater potential energy and will cause a greater flow rate. The change in potential energy over the brewing cycle is factored into the pressure and total flow curves represented in FIG. 9.

The priming of the transfer tube 88 as well as the creation of the hydraulic head advantage is also a contributing factor in the brewing of a better cup of coffee. The temperature of the water over the brewing cycle within the present invention is contemplated to be relatively lower than that required by an apparatus which relies solely upon the vapor pressure or boiling for the transfer of water. The initial wetting of the coffee grounds by the water prior to the application of microwave energy thereon, also begins the extraction process prior to the flow of heated water. The flow due to the hydraulic head advantage is initiated at a lower water temperature and is completed at a faster rate. The relatively cooler overall water temperature and the speed at which the brewing cycle is completed, greatly contributes to the coffee extraction and the prevention of the introduction of bitter oils into the brewed coffee.

Upon initiation of the flow over the bight of the transfer tube and the creation of the hydraulic head advantage, the flow rate will be substantially controlled by the diameter of the passageway within the transfer tube. This flow rate must be balanced to produced the desired brewing time and brewing temperature. The parameters of this balance include the consistency of the coffee and the effect of the microwave energy on the coffee grounds. Other factors should be apparent to those skilled in the brewing art upon review of the disclosure herein.

The present invention may be embodied in other specific forms without departing from the spirit or essential attributes thereof and, accordingly, reference should be made to the appended claims, rather than to the foregoing specifications, as indicating the scope of the invention.

I claim:

1. A microwave brewing apparatus for brewing a heated beverage within a microwave oven, comprising: reservoir means adapted to retain a quantity of water, the reservoir means made of a microwave transparent material such that water retained therein is heated by the application of microwave energy, transfer means having an inlet within the reservoir means, an outlet positioned externally of the reservoir means and below the inlet, and an inverted substantially U-shaped passageway between the inlet and the outlet, the passageway having a substantially constant bore, the transfer means causing a hydraulic head advantage between the reservoir means and the outlet upon the heating of the water within the reservoir means by application of microwave energy, the hydraulic head advantage creating a flow of water substantially continuously from the reservoir through the outlet over the brewing cycle.

2. An apparatus as claimed in claim 1 further comprising basket means adapted to retain a quantity of coffee grounds, the basket means positioned below the reservoir means, the basket means adapted to receive water from the outlet of the transfer means for brewing coffee therein and to direct brewed coffee through an outlet therefrom.

3. An apparatus as claimed in claim 2 further comprising a carafe adapted to support the basket means and to receive brewed coffee discharged from the outlet of the basket means.

4. An apparatus as claimed in claim 3 wherein the reservoir means, the basket means and the carafe interengage with one another in a substantially vertical alignment.

5. An apparatus as claimed in claim 4 wherein the carafe includes a handle.

6. An apparatus as claimed in claim 5 wherein the basket means also includes a handle.

7. An apparatus as claimed in claim 2 wherein the reservoir includes a lid and a container adapted to engage with one another to form a sealed chamber.

8. An apparatus as claimed in claim 7 wherein the transfer means is removably attached to the reservoir means.

9. An apparatus as claimed in claim 7 further comprising means to automatically release the seal of the chamber after initiation of the hydraulic head advantage through the transfer means.

10. An apparatus as claimed in claim 1 wherein the transfer means creates a flow rate from the reservoir which varies over time until completion of the transfer of substantially all water retained with the reservoir means.

11. An apparatus as claimed in claim 1 wherein the transfer means includes a valve means positioned at the inlet, the valve means adapted to prevent the flow of liquid into the reservoir means.

12. An apparatus for brewing coffee by the drip method within a microwave oven, comprising: means for retaining a quantity of water, means for retaining a quantity of coffee grounds for brewing, means for receiving brewed coffee discharged from the coffee rounds retaining means, means for creating a hydraulic head advantage between the water retaining means and the coffee grounds retaining means upon the application of microwave energy and the heating of the water, the head means creating a continuous flow of water from the water retaining means into the coffee grounds retaining means over the brewing cycle, whereby the heated water contacts the coffee grounds within the coffee grounds retaining means and brews coffee therein and whereby the brewed coffee is discharged into the receiving means.

13. An apparatus as claimed in claim 12 further comprising means for sealing the water retaining means from ambient air pressure.

14. An apparatus according to claim 13 wherein the sealing means releases after initiation of the hydraulic head advantage by the head means.

15. An apparatus according to claim 13 wherein the sealing means is adapted to pressurize the water retaining means above ambient pressure prior to application of microwave energy.

16. An apparatus as claimed in claim 12 wherein the head means further comprises valve means positioned between the water retaining means and the coffee grounds retaining means, the valve means permitting water flow only in the direction of the coffee grounds retaining means.

17. A microwave brewing apparatus for use within a microwave oven, comprising: reservoir means for retaining a quantity of water therein, the reservoir means made of a microwave transparent material, closure means for sealing the water within the reservoir means from ambient pressure, a transfer tube attached to the reservoir means having an inlet end and an outlet end, the inlet end positioned within the reservoir means and the outlet end positioned externally of the reservoir means below the inlet end, the tube forming a substantially U-shaped passageway, the U-shaped passageway having a bight between the inlet end and the outlet end, the bight positioned in the reservoir means above the inlet end, the transfer tube having a substantially constant bore, the application of microwave energy onto the water in the sealed reservoir means causing an increase in pressure therein and forcing water through the transfer tube inlet and towards the bight, the transfer tube initiating a hydraulic head advantage from the inlet end to the outlet end, causing a continuous flow of water from the reservoir means through the outlet end, basket means adapted to retain therein a quantity of brewing material permitting brewed extract to pass therethrough, the basket means positioned below the outlet end of the transfer tube, the basket means having an opening therein for page of the brewed extract, and a carafe for receiving a quantity of brewed extract from the basket means, whereby heating of the water by the microwave energy increases the pressure within the sealed reservoir means, forcing the heated water through the inlet end of the transfer tube, over the bight and initiating the hydraulic head advantage, whereby a substantially continuous flow of heated water flows over the brewing cycle from the reservoir through the transfer tube and onto the brewing material within the basket and brewed extract flowing from the basket into the carafe.

18. A microwave brewing apparatus as claimed in claim 17 wherein the reservoir means, the basket means and carafe are adapted to engage one another such that each is supported upon the carafe in substantial vertical alignment.

19. A microwave brewing apparatus as claimed in claim 17 further comprising means for releasing the seal of the closed reservoir means upon initiation of the hydraulic head advantage.

20. A microwave brewing apparatus for use within a microwave oven, comprising: reservoir means for retaining and sealing a quantity of water therein, a carafe for receiving a quantity of brewed extract, a transfer tube positioned within the reservoir means having an inlet end and an outlet end, the outlet end positioned externally of the reservoir below the inlet end, the tube forming a substantially inverted U-shaped passageway having a bight between the inlet end and the outlet end, the transfer tube forming a passageway between the inlet end and the outlet end, the passageway having a constant bore, basket means adapted to maintain therein a quantity of brewing material while permitting brewed extract to pass therethrough, the basket means positioned below the outlet end of the transfer tube and above the carafe, the reservoir means, the basket means, and the carafe supported upon one another in substantial vertical alignment, whereby the microwave energy of the oven heats the water and causes an increase in pressure within the sealed reservoir means, the pressure increase forcing the heated water through the inlet end of the passageway of the transfer tube and filling the portion of the tube between the inlet end and the bight, and upon flowing over the bight, creating a hydraulic head advantage, causing continuous flow of heated water from the reservoir through the transfer tube, onto the brewing material within the basket, and the brewed extract flowing into the carafe.

21. A method of brewing coffee in a microwave oven comprising the steps of:
 filling a quantity of water within a reservoir,
 filling a quantity of coffee grounds in a basket corresponding to the quantity of water in the reservoir,
 supporting the reservoir and basket on a carafe,
 placing the carafe, reservoir and basket into the cavity of a microwave oven,
 initiating a flow of water from the reservoir onto the coffee grounds in the basket by heating the water in the reservoir by the application of microwave energy, the flow being substantially continuous over the brewing cycle,
 receiving a quantity of brewed coffee in the carafe after the heated water contacting the coffee grounds in the basket, and
 thereafter removing the carafe, reservoir and basket from the microwave oven cavity.

22. A method of brewing coffee within a microwave oven, comprising the steps of:
 providing a quantity of water within a reservoir,
 providing a quantity of coffee grounds within a basket, the amount of coffee grounds corresponding to the quantity of water within the reservoir,
 sealing the water within the reservoir from ambient air,
 positioning the reservoir and basket within a microwave oven cavity,
 heating the water by applying microwave energy to the reservoir,
 initiating a hydraulic head advantage from the reservoir toward the basket and causing a substantially continuous flow of heated water,
 brewing coffee by the contact between the flow of heated water and the coffee grounds,
 releasing the seal of the reservoir after the initiation of the advantage,
 continuously collecting the brewed coffee from the basket,
 discontinuing the application of the microwave energy,
 removing the brewed coffee from the microwave oven and serving same.

23. A method of making a beverage in a microwave oven, which employs an apparatus having a microwave transparent pressurizable liquid reservoir disposed above a microwave transparent filter basket adapted to hold a quantity of brewing material, the reservoir and the filter basket adapted to be placed over a beverage receiving carafe, the reservoir being in fluid communication with the filter basket through a pressure overflow transfer means, the method comprising:

pouring a liquid into the liquid reservoir to a level not exceeding the overflow level of the transfer means;

placing a supply of brewing material in the filtered basket;

positioning the reservoir over said filter basket and placing the reservoir and the filter basket over the carafe;

closing said reservoir and simultaneously initiating a brief flow of liquid from the reservoir, through the transfer means and into the filter basket so as to contact the brewing material;

heating the liquid in the reservoir with microwave energy to raise the liquid vapor pressure in the reservoir sufficiently to force the liquid from the reservoir through the pressure overflow transfer means and into the filter basket to make a beverage; and collecting the beverage in the carafe.

24. The method of claim 23 wherein the liquid is water.

25. The method of claim 24 wherein the brewing material is ground coffee.

26. A beverage brewing apparatus for use in a microwave oven, adapted to be placed over a beverage receiving carafe having an open upper end, comprising:

a microwave transparent filter basket having a filter positioned in a bottom part thereof, the filter basket adapted for holding a quantity of a brewing material and for dispensing of a brewed beverage therefrom into the carafe;

a pressurizable microwave transparent reservoir adapted to hold a quantity of liquid up to a predetermined level, the reservoir positioned generally above the filter basket; and pressure overflow transfer means through which the reservoir is in fluid communication with the filter basket and which is adapted to hold the liquid within the reservoir until pressure in the reservoir rises sufficiently to force the liquid at least partially through the overflow means into the filter basket, the pressure overflow transfer means comprising an inverted U-tube, one end of the U-tube being connected to an opening in the bottom of the reservoir, the open distal end of the U-tube extending above the bottom of the reservoir therewithin and the bend of the U-tube extending above both ends and above the predetermined liquid level in the reservoir.

27. The apparatus of claim 26 wherein the liquid is water.

28. The apparatus of claim 27 wherein the brewing material is ground coffee.

* * * * *